(12) United States Patent
Takeuchi et al.

(10) Patent No.: US 6,605,143 B2
(45) Date of Patent: Aug. 12, 2003

(54) WATER BASED INK COMPOSITION FOR WRITING INSTRUMENT

(75) Inventors: Yoji Takeuchi, Yokohama (JP); Shigeru Miyazaki, Yokohama (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 147 days.

(21) Appl. No.: 09/870,861

(22) Filed: May 30, 2001

(65) Prior Publication Data

US 2002/0007764 A1 Jan. 24, 2002

(30) Foreign Application Priority Data

Jun. 1, 2000 (JP) ........................................ 2000-164962

(51) Int. Cl.[7] .............................................. C09D 11/16
(52) U.S. Cl. ................................ 106/31.43; 106/31.02; 106/31.75
(58) Field of Search ..................... 106/31.43, 31.75, 106/31.02

(56) References Cited

FOREIGN PATENT DOCUMENTS

| JP | 56-81377 | 7/1981 | ............ C09D/11/18 |
| JP | 63-223078 | 9/1988 | ............ C09D/11/16 |
| JP | 8-283645 | 10/1996 | ............ C09D/11/16 |
| JP | 09316382 A1 * | 12/1997 | |

OTHER PUBLICATIONS

Derwent abstract of JP09/316382, Dec. 1997.*

* cited by examiner

Primary Examiner—Helene Klemanski
(74) Attorney, Agent, or Firm—Darby & Darby

(57) ABSTRACT

A water based ink composition for a writing instrument containing an N-acylglutamic acid ester and further containing a colorant, a perfume and water, which is less liable to cause feathering of the lines and in which a perfume is dispersed and retained in an aqueous medium in a stable state and the fragrance lasts long.

7 Claims, No Drawings

WATER BASED INK COMPOSITION FOR WRITING INSTRUMENT

BACKGROUND OF THE INVENTION

1. Field of the Invention

The present invention relates to a water based ink composition for a writing instrument which sheds fragrance in writing and which imparts faint fragrance as well to drawn lines.

2. Description of the Related Art

In general, perfumes are oil-soluble, and an emulsifier or a dispersant which forms protective colloid is required in order to emulsify or disperse them in water. Water-soluble resins or surfactants are used as the protective colloid described above. In almost all water-soluble resins, however, use of a necessary and sufficient amount of a resin required for dispersing a perfume raises a viscosity of the liquid and makes it inadequate for an ink for a writing instrument.

On the other hand, an emulsion which is prepared using a surfactant in an amount enough for emulsifying a perfume in a stable state is reduced in the surface tension to a large extent, so that an ink prepared using the emulsion has the practical problem that drawn lines are liable to cause feathering. Further, an ink prepared merely emulsifying and dispersing a perfume by the method described above involves the problem that fragrance is shed immediately after writing but the fragrance is lost soon thereafter and can not be retained for long time (no durability).

Those which have so far been known as ink compositions for a writing instrument containing a perfume shedding fragrance in writing include, for example, inks for a ball point pen comprising dyes, resins and organic solvents, wherein a perfume having a compatibility with the above inks is added (Japanese Patent Application Laid-Open No. Sho 56-81377), perfume-containing water based inks blended with a perfume, maltosyl cyclodextrin (MCD), a colorant and water (Japanese Patent Application Laid-Open No. Sho 63-223078) and water based ink compositions for a writing instrument comprising a colorant, a perfume, a partially sulfonated polyester resin and water (Japanese Patent Application Laid-Open No. Hei 8-283645).

However, the ink composition disclosed in Japanese Patent Application Laid-Open No. Sho 56-81377 involves the problem that even if adding a perfume having compatibility, feathering is caused on a paper surface in writing. Also, the ink composition disclosed in Japanese Patent Application Laid-Open No. Sho 63-223078 is prepared by including a perfume in MCD and adding the above inclusion compound to a water based ink, and therefore the perfume contained in this water based ink tends to easily be separated with the passage of time, particularly with the passage of time at a high temperature, so that the ink composition involves problems in dispersibility of the perfume and durability of fragrance. Further, the ink composition disclosed in Japanese Patent Application Laid-Open No. Hei 8-283645 involves the problem that fragrance is shed immediately after writing but the fragrance is lost thereafter and can not be retained for long time (no durability).

The present invention intends to solve the problems of the conventional techniques described above, and an object thereof is to provide a water based ink composition for a writing instrument which is less liable to cause feathering and has durability of fragrance and in which a perfume is dispersed and retained in an aqueous medium in a stable state.

SUMMARY OF THE INVENTION

Intensive researches repeated by the present inventors regarding the problems of the conventional techniques described above have resulted in successfully obtaining a water based ink composition for a writing instrument which meets the object described above by adding a specific ink component to a water based ink composition for a writing instrument comprising a colorant and a perfume, and thus the present invention has been completed.

That is, the water based ink composition for a writing instrument of the present invention contains an N-acylglutamic acid ester and further contains a colorant, a perfume and water.

DETAILED DESCRIPTION OF THE PREFERRED EMBODIMENTS

The embodiment of the present invention shall be explained below in detail.

The water based ink composition for a writing instrument of the present invention contains an N-acylglutamic acid ester and further contains a colorant, a perfume and water.

The N-acylglutamic acid ester which is used in the present invention is used for the purposes of a feathering inhibitor, a fragrance durability-improving agent and inhibiting separation of the perfume.

The above-mentioned N-acylglutamic acid ester can be obtained by acylating glutamic acid, which is an acidic amino acid, with a natural higher fatty acid and then esterifying the acylated product with a higher alcohol. The N-acylglutamic acid ester has an excellent solubility, emulsifiability and dispersability. In the presnt invention, all publicly-known N-acylglutamic acid esters can be used as long as they do not damage the characteristics of the ink composition of the present invention, and it is possible to use one kind thereof or in combination of two different kinds or more thereof.

Examples of the preferably commercially available N-acylglutamic acid esters include luaroylglutamic acid dioctyldodecyl ester "LG-OD", stearoylglutamic acid dioctyldodecyl ester "SG-OD", lauroylglutamic acid POE(2) octyldodecylether diester "LGOD-2", lauroylglutamic acid POE(5) octyldodecylether diester "LGOD-5", lauroylglutamic acid POE(2) stearylether diester "LGS-2" and lauroylglutamic acid POE(5) stearylether diester "LGS-5", all of which are manufactured by Nihon Emulsion Co., Ltd.

In the present invention, a mixture of at least one of the respective N-acylglutamic acid esters described above has a content of 0.01 to 10% by weight, preferably 0.5 to 5% by weight based on the total amount of the ink composition.

If a content of the N-acylglutamic acid ester is less than 0.01% by weight based on the total amount of the ink composition, the feathering-inhibiting effect, the fragrance durability-improving effect and the perfume separation-inhibiting effect are inferior, and the effects of the present invention can not be displayed. On the other hand, if the content exceeds 10% by weight, the ink is less liable to be dried when transferred onto a paper face, and when it is used for a ball point pen, a discharge amount of the ink from the pen tip is reduced. Accordingly, the such contents are not preferred.

The colorant used in the present invention includes, for example, pigments and water soluble dyes.

The pigment shall not specifically be restricted and includes at least one selected from inorganic and organic pigments, titanium oxide and pseudo pigments obtained by coloring resin emulsions with dyes, all of which are conventionally used for a water based ink.

The inorganic pigments include, for example, carbon black, metal powder and the like.

The organic pigments include, for example, azo lakes, insoluble azo pigments, chelate azo pigments, phthalocyanine pigments, perylene and perinone pigments, anthraquinone pigments, quinacridone pigments, dye lakes, nitro pigments and nitroso pigments.

To be specific, included are inorganic pigments such as carbon black, titanium black, zinc oxide, red iron oxide, chromium oxide, mica titan, black iron oxide, cobalt blue, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium sulfate, baryte powder, calcium carbonate, white lead, Prussian blue, manganese violet, aluminum powder and bronze powder, C. I. Pigment Blue 1, C. I. Pigment Blue 15, C. I. Pigment Blue 17, C. I. Pigment Blue 27, C. I. Pigment Red 5, C. I. Pigment Red 22, C. I. Pigment Red 38, C. I. Pigment Red 48, C. I. Pigment Red 49, C. I. Pigment Red 53, C. I. Pigment Red 57, C. I. Pigment Red 81, C. I. Pigment Red 104, C. I. Pigment Red 146, C. I. Pigment Red 245, C. I. Pigment Yellow 1, C. I. Pigment Yellow 3, C. I. Pigment Yellow 12, C. I. Pigment Yellow 13, C. I. Pigment Yellow 14, C. I. Pigment Yellow 17, C. I. Pigment Yellow 34, C. I. Pigment Yellow 55, C. I. Pigment Yellow 74, C. I. Pigment Yellow 83, C. I. Pigment Yellow 95, C. I. Pigment Yellow 166, C. I. Pigment Yellow 167, C. I. Pigment Orange 5, C. I. Pigment Orange 13, C. I. Pigment orange 16, C. I. Pigment Violet 1, C. I. Pigment Violet 3, C. I. Pigment Violet 19, C. I. Pigment Violet 23, C. I. Pigment Violet 50, and C. I. Pigment Green 7.

The pseudo pigments obtained by coloring resin emulsions with dyes include, for example, those obtained by coloring resins comprising copolymers of acrylonitrile, styrene and methyl methacrylate with dyes.

Any of direct dyes, acid dyes, food colors and basic dyes can be used for the water-soluble dyes.

The direct dyes include, for example, C. I. Direct Black 17, Direct Black 19, Direct Black 22, Direct Black 32, Direct Black 38, Direct Black 51, and Direct Black 71, C. I. Direct Yellow 4, Direct Yellow 26, Direct Yellow 44, and Direct Yellow 50, C. I. Direct Red 1, Direct Red 4, Direct Red 23, Direct Red 31, Direct Red 37, Direct Red 39, Direct Red 75, Direct Red 80, Direct Red 81, Direct Red 83, Direct Red 225, Direct Red 226, and Direct Red 227, and C. I. Direct Blue 1, Direct Blue 15, Direct Blue 71, Direct Blue 86, Direct Blue 106, and Direct Blue 119.

The acid dyes include, for example, C. I. Acid Black 1, Acid Black 2, Acid Black 24, Acid Black 26, Acid Black 31, Acid Black 52, Acid Black 107, Acid Black 109, Acid Black 110, Acid Black 119, and Acid Black 154, C. I. Acid Yellow 7, Acid Yellow 17, Acid Yellow 19, Acid Yellow 23, Acid Yellow 25, Acid Yellow 29, Acid Yellow 38, Acid Yellow 42, Acid Yellow 49, Acid Yellow 61, Acid Yellow 72, Acid Yellow 78, Acid Yellow 110, Acid Yellow 127, Acid Yellow 135, Acid Yellow 141, and Acid Yellow 142, C. I. Acid Red 8, Acid Red 9, Acid Red 14, Acid Red 18, Acid Red 26, Acid Red 27, Acid Red 35, Acid Red 37, Acid Red 51, Acid Red 52, Acid Red 57, Acid Red 82, Acid Red 87, Acid Red 92, Acid Red 94, Acid Red 115, Acid Red 129, Acid Red 131, Acid Red 138, Acid Red 186, Acid Red 249, Acid Red 254, Acid Red 265, and Acid Red 276, C. I. Acid Violet 15 and Acid Violet 17, C. I. Acid Blue 1, Acid Blue 7, Acid Blue 9, Acid Blue 15, Acid Blue 22, Acid Blue 23, Acid Blue 25, Acid Blue 40, Acid Blue 41, Acid Blue 43, Acid Blue 62, Acid Blue 78, Acid Blue 83, Acid Blue 90, Acid Blue 93, Acid Blue 103, Acid Blue 112, Acid Blue 113, and Acid Blue 158, and C. I. Acid Green 3, Acid Green 9, Acid Green 16, Acid Green 25, and Acid Green 27.

A large part of the food colors is included in the direct dyes and the acid dyes, and one example of those which are not included therein includes C. I. Food Yellow 3.

The basic dyes include, for example, C. I. Basic Yellow 1, ditto 2 and ditto 21, C. I. Basic orange 2, ditto 14 and ditto 32, C. I. Basic Red 1, ditto 2, ditto 9 and ditto 14, C. I. Basic Violet 1, ditto 3 and ditto 7, C. I. Basic Green 4, C. I. Basic Brown 12, C. I. Basic Black 2 and ditto 8.

These dyes each may be used alone or in combination of two or more kinds thereof.

A content of these colorants is 0.5 to 40% by weight, preferably 1 to 30% by weight based on the total amount of the ink composition.

The perfume used in the present invention includes, for example, those described in the following 1) to 6), and they each may be used alone or in combination of two or more kinds thereof:

1) Essential oils such as grape fruit oil, orange oil, lemon oil, lime oil, ylang ylang oil, cammomile oil, jasmin oil, hiba oil, peppermint oil, lavender oil and rosemary oil.
2) Terpenes such as a-pinene, β-pinene and limonene.
3) Alcohols such as linalool, 1-menthol, geraniol, borneol, lavandulol, hexyl alcohol, phenylethyl alcohol (Rose P.), furfuryl alcohol, cyclotene, maltol, eugenol and α-phenylethanol.
4) Aldehydes such as heptanal, octanal, dodecanal, tetradecanal, hexadecanal, citral, lyral, benzaldehyde and cyclamen aldehyde.
5) Esters such as ethyl acetate, propyl acetate, amyl acetate, linallyl acetate, benzyl acetate, dimethylbenzyl-carbinyl acetate and benzyl propionate.
6) Aromatic compounds such as nootkatone, ethylpyrazine, lemon terpeneless, orange terpeneless, ethylvanillin and furfurylmercaptan.

In the present invention, capable of being used as well are mixed perfumes prepared by suitably combining the respective perfumes described above, for example, banana perfume, blueberry perfume, vanilla perfume, mint perfume, apple perfume, peach perfume, melon perfume, pineapple perfume, grape perfume, lilac perfume and jasmin perfume.

For example, the banana perfume can be prepared by suitably blending vanillin, ethylvanillin, n-hexanal, isoamyl alcohol, trans-2-hexenal, n-butanol, isoamyl acetate, butyl acetate, isobutyl acetate, diacetyl, ethyl acetate, hexyl acetate, isoamyl butyrate, isoamyl isovalerate, cis-3-hexenol, cis-3-hexenyl acetate, acetic acid, isoeugenol, ethyl butyrate and a solvent. Further, the pineapple perfume can be prepared by suitably blending benzyl acetate, orange oil 3-fold, vanillin, isoamyl acetate, isoamyl butyrate, ethyl acetate, ethyl heptanoate, ethyl hexanoate, ethyl butyrate and allyl hexanoate.

Further, capable of being used as well are commercially available various mixed perfumes, for example, vanilla perfume [Vanilla BVK-3359 (manufactured by Takasago International Corporation)], mint perfume [Mint THP-8148 (manufactured by T. Hasegawa Co., Ltd.)], banana perfume [Banana T-1510 (manufactured by Yamamoto Perfumery Co., Ltd.)] and blueberry perfume [Blueberry V-647 (manufactured by Yamamoto Perfumery Co., Ltd.)].

A content of these perfumes falls in a range of 0.01 to 10% by weight, preferably 0.1 to 6% by weight based on the total amount of the ink composition.

If a content of these perfumes is less than 0.01% by weight, fragrance does not last long and comes to be not smelt. On the other hand, if it exceeds 10% by weight, an adverse effect is exerted on the aging stability of the ink composition. Accordingly, both ranges are not preferred.

In the present invention, the perfume is used in a range of the content (0.01 to 10% by weight) described above and added preferably in an amount of 70% or less, more preferably 60% or less in terms of a weight ratio based on the above-mentioned N-acylglutamic acid esters (one N-acylglutamic acid ester or a mixture of two or more N-acylglutamic acid esters).

Setting this weight ratio makes it possible to further display the feathering inhibiting effect, the fragrance durability-improving effect and the perfume separation-inhibiting effect.

In the present invention, when the pigment notably settles down, a viscosity-controlling agent is preferably added from a viewpoint of preventing settling.

The viscosity-controlling agent used includes at least one selected from synthetic polymers, natural gums, celluloses and polysaccharides.

The synthetic high polymers include, for example, polyacrylic acid and cross-linking type copolymers thereof, polyvinyl alcohol, polyvinylpyrrolidone and derivatives thereof, and polyvinyl methyl ether and derivatives thereof. The natural rubbers and the polysaccharides include, for example, tragacanth gum, guar gum, locust bean gum and xanthan gum. The celluloses include methyl cellulose, ethyl cellulose, hydroxyethyl cellulose and carboxymethyl cellulose.

To be specific, included are commercial products such as "Junron PW-111"manufactured by Nihon Junyaku Co., Ltd., "Hiviswako 104"manufactured by Wako Pure Chemical Ind. Co., Ltd., "KELZAN", "KELZAN AR", "K1A96", "K1A112", "RHEOZAN" and "K7C233"manufactured by Sansho Co., Ltd., "JAGUAR HP-8", "JAGUAR HP-60", "RHODOPOL 23" and "RHODOPOL 50MC" manufactured by Rhone Poulenc Japan Ltd., and "Echo Gum GM" manufactured by Dainippon Pharmaceutical Co., Ltd.

A content of these viscosity-controlling agents is preferably 0.1 to 1.5% by weight based on the total amount of the ink composition. The content varies depending on the kind of the viscosity-controlling agents, and it is preferably 0.1 to 1.5% by weight in the case of the synthetic polymers and preferably 0.1 to 0.8% by weight in the case of the natural polysaccharides.

If a content of these viscosity-controlling agents is less than 0.1% by weight, the effect of adding the viscosity-controlling agent can not be exhibited. On the other hand, if it exceeds 1.5% by weight, the ink is reduced in fluidity so that writing is liable to be inferior because of the poor flowability.

Other components (optional components) which are used for an ink composition for a writing instrument can further be added, if necessary, to the ink composition of the present invention as long as the effects of the present invention are not damaged.

Capable of being suitably selected and used as the other usable components are, for example, solvents including water-soluble polyhydric alcohols such as ethylene glycol, propylene glycol and glycerin, cellosolves such as ethylene glycol monomethyl ether (methyl cellosolve) and ethylene glycol monoethyl ether (ethyl cellosolve), carbitols such as diethylene glycol monomethyl ether (methyl carbitol) and diethylene glycol monoethyl ether (ethyl carbitol) and glycol ether esters such as ethylene glycol monoethyl ether acetate; pH adjusting agents including ammonia, urea, monoethanolamine, diethanolamine, triethanolamine, alkalin metal salts of carbonic acid and phosphoric acid such as sodium tripolyphosphate and sodium carbonate, and hydroxides of alkalin metals such as sodium hydroxide; preservatives or fungicides including phenol, sodium omadine, sodium pentachlorophenol, 1,2-benzisothiazoline-3-one, 2,3,5,6-tetrachloro-4-(methylsulfonyl)pyridine, alkalin metal salts of benzoic acid, sorbic acid and dehydroacetic acid such as sodium benzoate, and benzimidazole base compounds; rust preventives such as benzotriazole, dicyclohexylammonium nitrite, diisopropyl-ammonium nitrite and tolyltriazole; lubricants, wetting agents, and defoaming agents comprising; anionic surfactants such as carbonic acids and sulfonic acids; cationic surfactants such as ammonium salts and amines; other amphoteric surfactants; and nonionic surfactants.

Water used in the present invention includes purified water and ion-exchanged water, and a content thereof is a remainder (balance) of the total content of the respective components described above.

The water based ink composition for a writing instrument of the present invention can suitably used for a ball point pen, a brush pen, a felt tip pen and a marker.

In the water based ink composition for a writing instrument of the present invention thus constituted, in order to solve the respective problems described above caused when using the perfume, added as well as the colorant, the perfume and water is the N-acylglutamic acid ester which has a function as a feathering inhibitor, a function as a fragrance durability-improving agent and a function for inhibiting separation of the perfume, whereby exhibited are specific actions that the lines are less liable to cause feathering and fragrance is durable and that the perfume is dispersed and retained in an aqueous medium in a stable state (these points shall further be explained in detail in examples described later)

EXAMPLES

The present invention shall be explained below in detail with reference to examples and comparative examples, but it is a matter of course that the present invention shall not be restricted to the examples described below.

Examples 1 to 10 and Comparative Examples 1 to 3

Water based ink compositions for a writing instrument were prepared according to blending formation shown in the following Table 1.

The water based ink compositions obtained in Examples 1 to 10 and Comparative Examples 1 to 3 were evaluated for feathering of the ink, fragrance, separation of the perfume, coagulation of the pigment and writing feeling by the following evaluation methods. Ball point pens for evaluation were prepared to evaluate feathering of the ink, fragrance and writing feeling.

The results thereof are shown in the following Table 1.

Preparation of Ball Point Pens for Evaluation:

The respective inks were charged into refills comprising a polypropylene-made ink reservoir with an inner diameter of 4.0 mm and a length of 115 mm having no feed and a stainless steel-made tip with a ball having a diameter of 0.7 mm to prepare ball point pens for evaluation (UM-100 manufactured by Mitsubishi Pencil K. K.).

Evaluation Method of Feathering:

The ball point pen was used to write on a paper face (wood free paper) and sensorily evaluated according to the following evaluation criteria.

Evaluation criteria:
  ○: no feathering and clear lines
  Δ: feathering observed and unclear lines
  X: very unclear lines due to feathering Evaluation Method of Fragrance:

The ball point pen was used to write on a paper face (wood free paper) and sensorily evaluated according to the following evaluation criteria.

Evaluation criteria:
  ○: smell in writing, and the lines smell even after 5 hours
  X: smell in writing, but the lines do not smell after 5 hours Evaluation method of separation of the perfume:

The respective inks were tightly sealed in a vessel and left standing in a constant temperature chamber of 50° C. for 7 days, and then it was left cooling to evaluate the state of the inks according to the following evaluation criteria.

Evaluation criteria:
  ○: no change from before the test
  X: perfume separated

Evaluation Method of Coagulation of the Pigment:

The respective inks were tightly sealed in a vessel and left standing at room temperature for one week, and then it was passed through a sieve of 100 μm and evaluated according to the following evaluation criteria. This pigment was evaluated for coagulation in order to evaluate a dispersion stability of the pigment.

Evaluation criteria:
  ○: no residue
  X: the ink is hard to pass through the sieve or residue was present on the sieve Evaluation Method of Writing Feeling:

The ball point pen was used to write on a paper face (wood free paper) and evaluated the writing feeling according to the following evaluation criteria.

Evaluation Criteria:

⊚: very smooth writing feeling
  ○: smooth writing feeling
  Δ: writing feeling having a little poor smoothness
  X: very heavy writing feeling, and unpleasant feeling such as scratching is given (unusable level)

TABLE 1

(% by weight)

| | | Example | | | | | | | | | | Comparative Example | | |
|---|---|---|---|---|---|---|---|---|---|---|---|---|---|---|
| | Remark | 1 | 2 | 3 | 4 | 5 | 6 | 7 | 8 | 9 | 10 | 1 | 2 | 3 |
| Blending Formation | | | | | | | | | | | | | | | |
| *Colorant* | | | | | | | | | | | | | | | |
| Blue pigment | (1) | 10.0 | 10.0 | | | | | | 10.0 | | | 10.0 | | |
| Yellow pigment | (2) | | | 10.0 | | | | | | 10.0 | | | 10.0 | |
| White pigment | (3) | | | | 20.0 | 20.0 | | 2.0 | | | 20.0 | | | 10.0 |
| Pearl pigment | (4) | | | | | | 5.0 | | | | | | | |
| Lubricant | (5) | 0.5 | 0.5 | 0.5 | 0.5 | 0.5 | 0.5 | 0.5 | 0.5 | | 0.5 | 0.5 | 0.5 | 0.5 |
| Propylene glycol | — | 5.0 | 5.0 | 5.0 | 5.0 | 5.0 | 5.0 | 5.0 | 5.0 | 5.0 | 5.0 | 5.0 | 5.0 | 5.0 |
| Xanthan gum | (6) | | | 0.1 | 0.1 | 0.1 | 0.1 | 0.1 | | | 0.1 | | | 0.1 |
| N-acylglutamic acid ester | (7) | 5.0 | 5.0 | 5.0 | | | | | | 5.0 | 2.5 | | | |
| | (8) | | | | 5.0 | 5.0 | 5.0 | | | | | | | |
| | (9) | | | | | | | 5.0 | 5.0 | | 2.5 | | | |
| *Perfume* | | | | | | | | | | | | | | | |
| Perfume A | (10) | | | 1.0 | | 1.0 | | 1.0 | | | | | 1.0 | |
| Perfume B | (11) | 1.0 | | | 1.0 | | | | 1.0 | | | 1.0 | | |
| Perfume C | (12) | | | | | | 1.0 | | | 1.0 | 1.0 | | | 1.0 |
| Perfume D | (13) | | 2.0 | | | | | | | | | | | |
| Water (purified water) | — | 78.4 | 77.5 | 78.4 | 68.4 | 68.4 | 83.4 | 86.4 | 78.5 | 79.0 | 68.4 | 83.5 | 83.5 | 83.4 |
| *Evaluation* | | | | | | | | | | | | | | | |
| Feathering | | ○ | ○ | ○ | ○ | ○ | ○ | ○ | ○ | ○ | ○ | ○ | Δ | ○ |
| Fragrance | | ○ | ○ | ○ | ○ | ○ | ○ | ○ | ○ | ○ | ○ | X | X | X |
| Separation of perfume | | ○ | ○ | ○ | ○ | ○ | ○ | ○ | ○ | ○ | ○ | X | X | Δ |
| Coagulation of pigment | | ○ | ○ | ○ | ○ | ○ | ○ | ○ | ○ | ○ | ○ | X | X | X |
| Writing feeling | | ⊚ | ⊚ | ⊚ | ⊚ | ⊚ | ⊚ | ⊚ | ⊚ | ○ | ⊚ | ○ | ○ | ○ |

The remarks shown in Table 1 mean the followings:
(1) Phthalocyanine blue (Chromofine Blue 4965 manufactured by Dainichiseika Color & Chemicals MFG. Co., Ltd.)
(2) Lacqutimine color (Golden Yellow FL2R Conc manufactured by Dainichiseika Color & Chemicals MFG. Co., Ltd.)
(3) Titanium oxide: Tipure R-900 (manufactured by Du Pont Co., Ltd.)
(4) Iriodin 303 Royal Gold (manufactured by Merck Japan, Ltd.)
(5) Potassium oleate
(6) KELZAN (manufactured by Sansho Co., Ltd.)
(7) Stearoylglutamic acid dioctyldodecyl ester (SG-OD manufactured by Nihon Emulsion Co., Ltd.)
(8) Lauroylglutamic acid POE(5) octyldodecylether diester (LGOD-5 manufactured by Nihon Emulsion Co., Ltd)
(9) Lauroylglutamic acid POE(5) stearylether diester (LGS-5 manufactured by Nihon Emulsion Co., Ltd)
(10) Banana perfume [Banana T-1510 (manufactured by Yamamoto Perfumery Co., Ltd.)
(11) Blueberry perfume [Blueberry V-647 (manufactured by Yamamoto Perfumery Co., Ltd.)
(12) Vanilla perfume [Vanilla BVk-3359 (manufactured by Takasogo International Corporation)
(13) Mint perfume [Mint THP-8148 (manufactured by T. Hasegawa Co., Ltd.)

Consideration of Table 1

As apparent from the results shown in Table 1 described above, it has been confirmed that in Examples 1 to 10 falling in the scope of the present invention, feathering of the ink is not observed and fragrance lasts long as compared with Comparative Examples 1 to 3 falling outside the scope of the present invention and that separation of the perfume and coagulation of the pigment are not caused and very smooth writing feeling is gained.

In contrast with this, Comparative Examples 1 to 3 are cases in which the N-acylglutamic acid ester which is the essential components in the present invention and has a function as a feathering inhibitor, a function as a fragrance durability-improving agent and a function for inhibiting separation of the perfume are not contained, and it has been confirmed that in these cases, all evaluation items of feathering of the ink, fragrance, separation of the perfume and coagulation of the pigment can not be satisfied.

What is claimed is:

1. A water based ink composition for a writing instrument containing an N-acylglutamic acid ester and further containing a colorant, a perfume and water.

2. The water based ink composition of claim 1, wherein the N-acylglutamic acid ester is lauroylglutamic acid dioctyldodecyl ester.

3. The water based ink composition of claim 1, wherein the N-acylglutamic acid ester is stearoylglutamic acid dioctyldodecyl ester.

4. The water based ink composition of claim 1, wherein the N-acylglutamic acid ester is lauroylglutamic acid POE (2) octyldodecylether diester.

5. The water based ink composition of claim 1, wherein the N-acylglutamic acid ester is lauroylglutamic acid POE (5) octyldodecylether diester.

6. The water based ink composition of claim 1, wherein the N-acylglutamic acid ester is lauroylglutamic acid POE (2) stearylether diester.

7. The water based ink composition of claim 1, wherein the N-acylglutamic acid ester is lauroylglutamic acid POE (5) stearylether diester.

* * * * *